United States Patent [19]

Mueller et al.

[11] Patent Number: 4,987,792
[45] Date of Patent: Jan. 29, 1991

[54] SHIFTING ARRANGEMENT FOR AN AUTOMATIC TRANSMISSION OF A MOTOR VEHICLE

[75] Inventors: Robert Mueller, Mönsheim; Ulrich Maier, Freiberg; Friedrich Raff, Eberdingen, all of Fed. Rep. of Germany

[73] Assignee: Dr. Ing. H. C. F. Porsche Aktiengesellschaft, Weissach, Fed. Rep. of Germany

[21] Appl. No.: 302,387

[22] Filed: Jan. 27, 1989

[30] Foreign Application Priority Data

Mar. 10, 1988 [DE] Fed. Rep. of Germany ....... 3807881

[51] Int. Cl.$^5$ .............................................. B60K 20/00
[52] U.S. Cl. ................................... 74/473 R; 74/141.5; 74/335; 200/61.88
[58] Field of Search .................. 74/335, 473 R, 141.5, 74/471 XY, 473 P; 200/61.88

[56] References Cited

U.S. PATENT DOCUMENTS

| | | | |
|---|---|---|---|
| 4,442,730 | 4/1984 | Snoy | 74/473 P X |
| 4,463,623 | 8/1984 | Miyata et al. | 74/473 R |
| 4,519,266 | 5/1985 | Reinecke | 200/61.88 X |
| 4,521,650 | 6/1985 | Oswald | 200/61.88 |
| 4,570,502 | 2/1986 | Klatt | 74/335 R |
| 4,592,249 | 6/1986 | Lehman et al. | 74/473 R |
| 4,633,987 | 1/1987 | Rögner et al. | 74/335 X |
| 4,646,582 | 3/1987 | Kijima | 74/473 R |
| 4,784,007 | 11/1988 | Ishida et al. | 74/335 |

OTHER PUBLICATIONS

"Electronically Controlled Mechanical Automatic Transmission for Heavy Duty Trucks & Buses", S. Tanaka et al., SAE Proceeding 861050, pp. 161-169, Oct. 1986, Considered, but not filed in compliance.

Primary Examiner—Peter A. Aschenbrenner
Attorney, Agent, or Firm—Barnes & Thornburg

[57] ABSTRACT

A shifting arrangement for an automatic transmission of a motor vehicle controlled by an electronic control apparatus includes a shifting lever to be manually actuated. By pivoting the shifting lever in a first shifting lane, the different transmission speeds can be selected. After shifting the shifting lever by way of a cross lane into a second shifting lane, the desired forward speed can be manually engaged by means of the same.

18 Claims, 3 Drawing Sheets

SHIFTING ARRANGEMENT FOR AN AUTOMATIC TRANSMISSION OF A MOTOR VEHICLE

BACKGROUND AND SUMMARY OF THE INVENTION

The present invention relates to a shifting arrangement for an automatic transmission of a motor vehicle controlled by an electronic control apparatus, which includes a selector lever by the displacement of which in a first shifting lane the different transmission speeds to be automatically shifted are preselectable.

Such a transmission is described in the Bosch Techn. Berichte [Bosch Technical Reports] 7 (1983)4, page 160 to 166. The drive takes place by way of a hydrodynamic torque converter which serves as starting coupling and for the purpose of moment transmission. The torque converter can be bridged by means of a bridging or by-pass clutch and a rigid drive to a series-connected four-speed planetary gear transmission can be established. The transmission output rotational speed, the load condition of the engine, the engine rotational speed as well as the position of the selector lever are detected by sensors and are fed as electrical magnitudes to an electronic control apparatus. The respective optimum transmission speed is determined from these informations according to a predetermined computer program and is hydraulically engaged by the control apparatus by way of electromagnetic transmission-speed-shifting valves in the transmission. Three shifting programs are selectable by the driver on a program switch: an economy program for a particularly economic driving manner, a power program for sporty driving and a program with manual adjustment of the respectively desired transmission speed by way of the selector lever. According to a further development, the first two programs are integrated into the electronic control apparatus which, for this purpose, has been enlarged by control units that need not be explained in detail herein.

It is the object of the present invention to make realizable the program: manual speed selection by means of the selector lever, in order to be able to dispense with the program switch and thus to constitute the transmission more friendly as regards operation and more favorable as regards manufacture.

The underlying problems are solved according to the present invention in that the selector lever is adapted to be shifted by way of a transverse lane into a second shifting lane parallel to a first shifting lane, and in that by displacement in the second shifting lane the forward speeds of the transmission are manually engageable by means of the selector lever. A particularly advantageous construction of the present invention is realized if a shifting-up by one speed is manually engageable by a single displacement of the shifting lever in the second shifting lane from a neutral center position thereof and by contacting a plus sensor in the one direction and if a shifting-down by one speed is manually engageable by a single displacement of the shifting lever in the opposite direction and by contacting with a minus sensor whereby the shifting lever is automatically returned into the neutral position after each displacement. Furthermore, a particularly favorable arrangement is realized in that the first shifting lane extending in the driving direction, the second shifting lane and the cross lane are provided in a cover plate which, together with a left lateral part and a right lateral part and a bottom plate form a hollow frame secured at the body of the vehicle. If for the manual speed shifting the selector lever is constructed as rocker-type lever which during pivoting through about 5° from its neutral central position in the one direction causes a shifting-up by one speed and in the other direction a shifting-down by one speed, then the driver can engage the transmission speeds rapidly and effortlessly. A brief tipping of the selector lever in one of the directions suffices in order to shift the transmission by one speed. Thereafter, the rocker lever automatically returns into the neutral position. When tipping the rocker lever twice, a shifting-up or shifting-down by two speeds takes place. In the selected four-speed transmission, a shifting-up or shifting-down maximum by three speeds can take place by tipping the shifting lever three times. The present invention also offers advantageous constructive realizations of the selector lever and its bearing support in the hollow frame of the vehicle body.

BRIEF DESCRIPTION OF THE DRAWINGS

These and other objects, features, and advantages of the present invention will become more apparent from the following description when taken in connection with the accompanying drawing which shows, for purposes of illustration only, one embodiment in accordance with the present invention, and wherein.

DETAILED DESCRIPTION OF THE DRAWINGS

Figure 1:
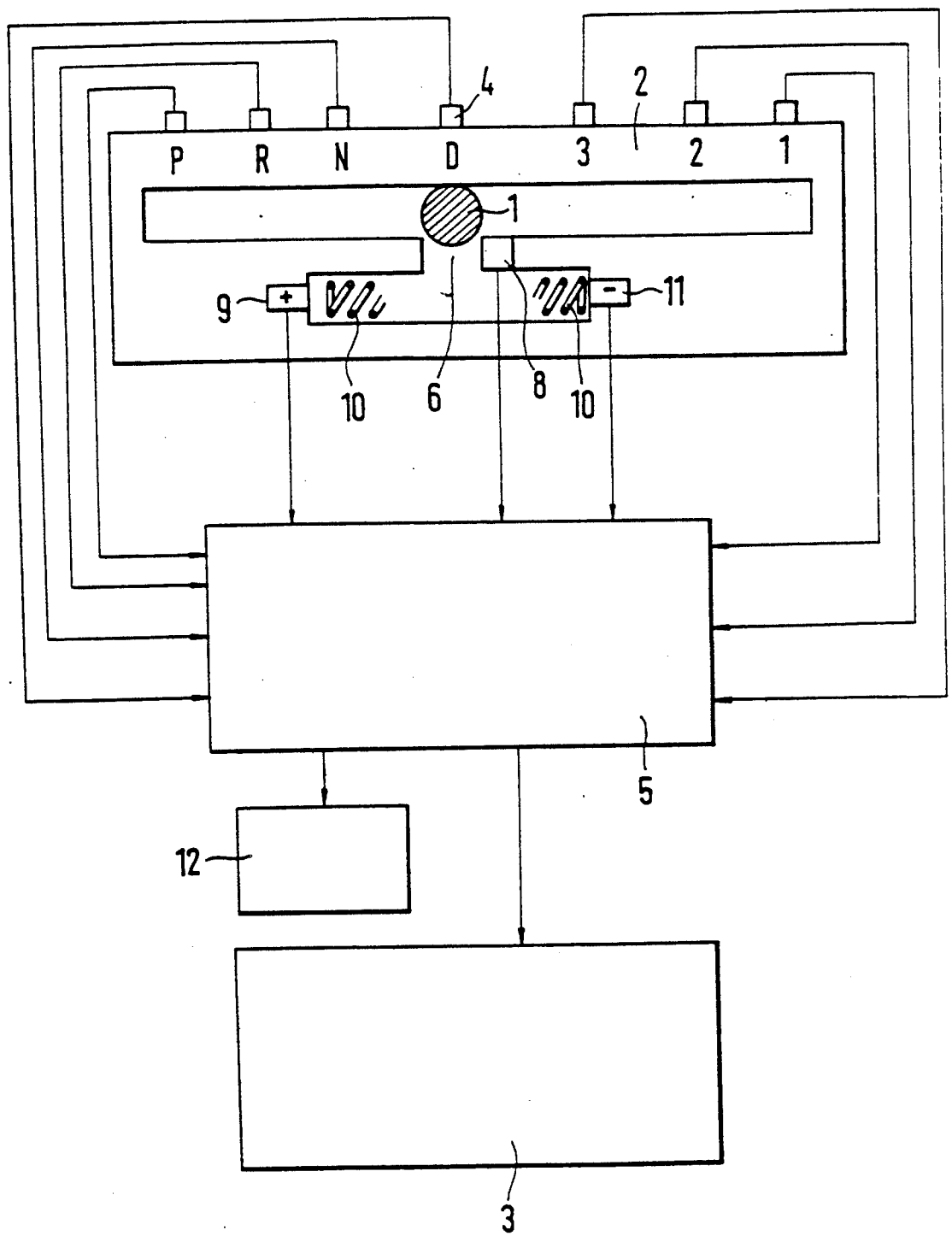
FIG. 1 is a schematic view of a transmission control system with a shifting arrangement in accordance with the present invention.

Referring now to the drawing wherein like reference numerals are used throughout the various views to designate like parts, the different positions P = parking, R = reverse speed, N = neutral-zero, D = drive in fourth speed, 3 = third speed, 2 = second speed, 1 = first speed of an automatic transmission 3 are adapted to be selected by means of a shifting lever 1 which is displaceable in the longitudinal direction of the motor vehicle in a first shifting lane 2 (FIG. 1). The selected positions are detected by sensors 4 which apply electrical signals to a control apparatus 5 of the transmission 3. Out of the selector position D, the selector lever 1 can be shifted by way of a transverse lane 6 into a second shifting lane 7 parallel to the first shifting lane 2. The shifting operation is detected by a sensor 8 which thereby supplies a signal to the control apparatus 5.

When the selector lever 1 is displaced or pivoted in the second shifting lane 7 in the driving direction of the motor vehicle, a plus sensor 9 responds whose signal causes the control apparatus 5 to undertake a shifting-up by one speed in the transmission 3. Thereafter, the selector lever 1 is pressed back into the neutral, center position of the shifting lane 7 by a spring 10. With a repeated tipping once more at the sensor 9, a further shifting-up by one speed takes place in case the highest transmission speed is not already engaged. During the displacement or pivoting of the selector lever opposite the driving direction, a minus sensor 11 supplies a signal to the control apparatus 1 and initiates a shifting-down by one speed in the transmission 3. An optical indicating apparatus 12 is connected with the control apparatus 5 which indicates the angular positions in the first shifting lane 2 and the respectively engaged transmission speed 1, 2, 3 or 4.

Figure 2:
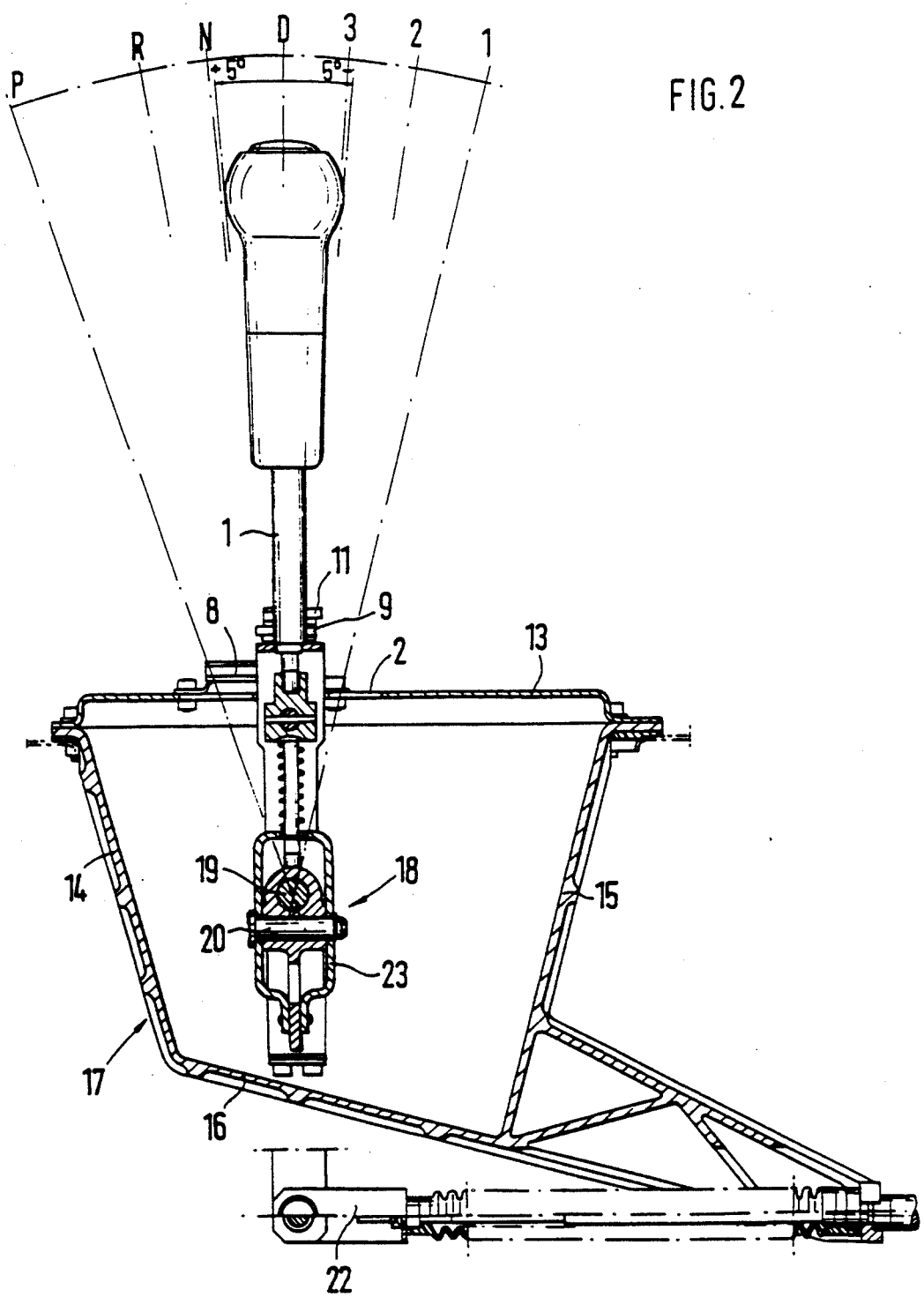
FIG. 2 is a longitudinal cross-sectional view through the shifting in accordance with the present invention.
Figure 3:
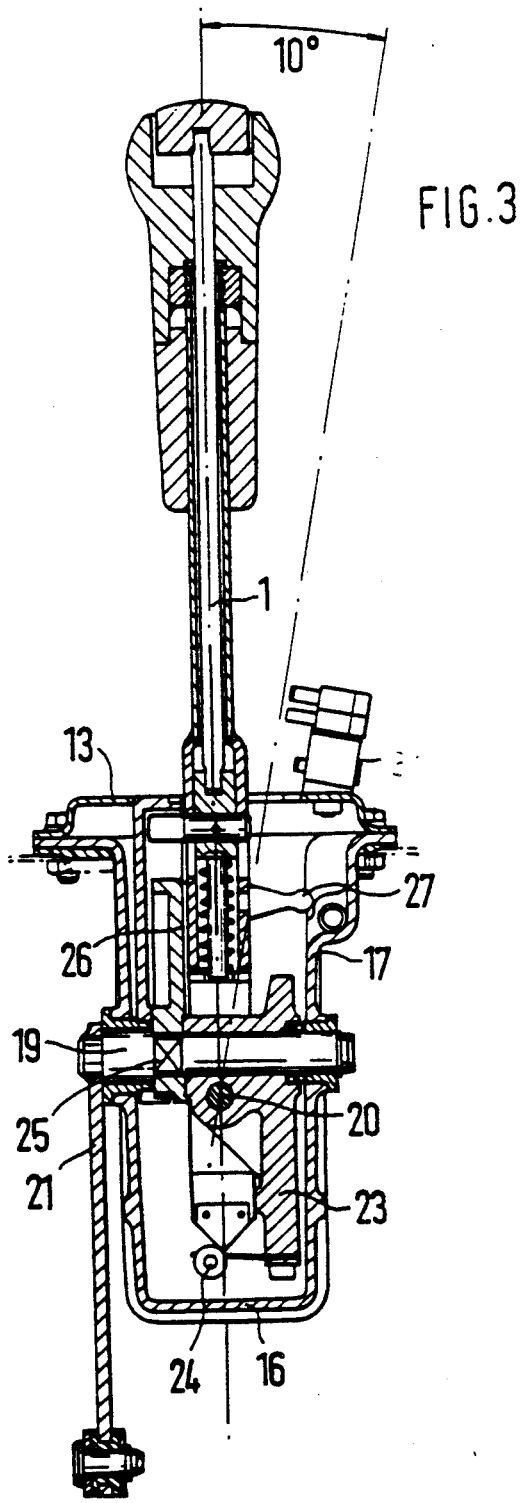
FIG. 3 is a transverse cross-sectional view through the shifting in accordance with the present invention.
Figure 4:
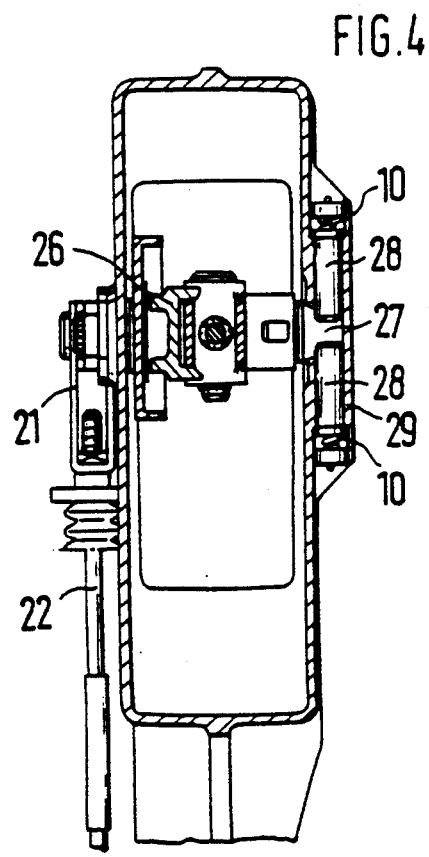
FIG. 4 is a cross-sectional view taken along line IV—IV of FIG. 3.

The constructive realization of the shifting arrangement is shown in FIGS. 2, 3 and 4.

The first shifting lane 2 extending in the longitudinal direction of the motor vehicle and the second shifting lane 7 as well as the cross lane 6 are constructed as templates for the selector lever 1 in a cover plate 13. The cover plate 13 is screwed together with a left lateral part 14 and a right lateral part 15 and forms with the same and with a bottom plate 16 a hollow frame generally designated by reference numeral 17 (FIG. 2) which is fixed at the body of the motor vehicle. The part of the selector lever 1 protruding into the hollow frame 17 is connected with a cardan joint generally designated by reference numeral 18 whereby the selector lever 1 is pivotal about the two bearing bolts 19 and 20 of the cardan joint 18 which are disposed transverse to one another.

The upper bearing bolt 19 is supported in the hollow frame 17 (FIG. 3). The selector lever 1 is pivotal about the bearing bolt 19 for carrying out the selected positions P, R, N, D, 3, 2, 1. For that purpose, a pivot angle of altogether 34.6° is provided from the center selected position D in the driving direction of the motor vehicle whereas in the opposite direction, a pivot angle of 28.2° is provided. During pivoting, an actuating lever 21 (FIG. 3) secured outside of the hollow frame at the bearing bolt 19 is taken along, which engages into the transmission 3 by way of an actuating rod 22 pivotally secured thereon and actuates the sensors 4 disposed thereat for the selected positions P, R, N, D, 3, 2, 1.

In the lower area of the selector lever 1 a joint-frame 23 (FIGS. 2 and 3) is connected with the same which is pivoted along when carrying out the selecting positions. The bearing bolt 20 is supported in the joint-frame 23 underneath the bearing bolt 19; the selector lever 1 is pivotal about the bearing bolt 20 when shifting from the first shifting lane 2 into the second shifting lane 7. The shifting angle necessary therefor amounts to about 10° (FIG. 3). The shifting positions of the selector lever 1 are arrested by a spring detent 24 secured at the joint-frame 23 and acting against the bottom side of the selector lever 1. If the selector lever 1 is shifted out of the position D through the cross lane 6 into the second shifting lane 7, then the connection with the entrainment member 26 non-rotatable on the bearing bolt 19 by means of a square-head connection 25 is disengaged in order not to transmit to the selected position sensors 4 disposed in the transmission 3 the rocking movements to be carried out in the second shifting lane 7.

After shifting into the second lane 7, a pin 27 (FIGS. 3 and 4) protruding at right angle from the shifting lever 1 engages between two retaining pins 28 abutting at the same on both sides which are supported in a spring pot 29 by the springs 10. The spring pot 29 is formed in one piece with the hollow frame externally at the latter. The selector lever 1 is retained in a neutral center position in the second shifting lane 7 by means of the retaining pins 28 and the springs 10. A pivoting of the selector lever 1 in the second shifting lane 7 through about 5° suffices in order to cause the plus sensor 9, respectively, in the opposite direction, the minus sensor 11 to respond and to initiate a shifting-up or shifting down by one speed in the transmission 3. The plus sensor 9 and the minus sensor 11 and the sensor 8 detecting the shifting-over are constructed as electro-mechanical microswitches and are accommodated in a switch housing 30 which is threadably secured to the top of the cover plate 13 (FIG. 3).

While we have shown and described only one embodiment in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

We claim:

1. A shifting arrangement for an automatic transmission of a motor vehicle controlled by an electronic control means to change transmission speeds in response to the position of a selector lever means, the different transmission speeds to be automatically engaged being preselectable by pivoting of the selector lever means in a first shifting lane to one of a plurality of positions wherein the position of the selector lever means would cause the control means to select a particular speed, with the control means in at least one of the positions of the selector lever means operable to automatically change the selected particular speed to another one of a plurality of speeds, the selector lever means being shiftable by way of a transverse lane into other positions in a second shifting lane parallel to the first shifting lane, and the forward speeds of the transmission being manually selected by a driver via the electronic control means in response to movement of the selector lever means to the other positions in the second shifting lane.

2. A shifting arrangement, according to claim 1, a shifting-up by one speed being manually engageable by a one-time pivoting of the selector lever means out of a neutral, center position in the second shifting lane and by contacting a plus position sensor in one direction and a shifting-down by one speed being manually engageable by a one-time pivoting of the selector lever means in the opposite direction and by contacting a minus position sensor, the contact of the position sensors actuating the control means and the selector lever means being subsequently returned automatically into the neutral, center position after each pivoting thereof.

3. A shifting arrangement according to claim 1, wherein the selected positions of the selector lever means in the first shifting lane are detected by sensors, the shifting from the first shifting lane into the second shifting lane by a further sensor and signals from the sensors being applied to the electronic control means for actuating the transmission and an indicating apparatus for the selected positions is activated.

4. A shifting arrangement according to claim 3, wherein the number of pivot movements of the selector lever means in the second shifting lane are detected by sensors and applied to the control means to cause the control means to correspond to the number of the successive pivot movements of the selector lever means to shift the transmission up, respectively, down, by one, two or three speeds.

5. A shifting arrangement according to claim 2, wherein the first shifting lane extends in a driving direction of the vehicle, the second shifting lane and the transverse lane are provided in a cover plate which, together with a left lateral part and a right lateral part and a bottom plate form a hollow frame secured at a relatively fixed part of the motor vehicle.

6. A shifting arrangement according to claim 5, wherein the selector lever means is supported at the hollow frame in a cardan joint having two bearing bolts disposed perpendicular to one another for carrying out the selecting movements and the cross movement required for shifting-over from the first to the second shifting lanes.

7. A shifting arrangement according to claim 6, wherein the selector lever means includes a pin-like member and in the second shifting lane is held in the neutral, center position by two springily supported retaining pins abutting at the selector lever pin-like member on both sides thereof.

8. A shifting arrangement according to claim 7, wherein microswitches serve as position sensors for the shifting-over operation as well as for the shifting-up and shifting-down pivot movements which are accommodated in a switch housing threadably secured at the top of the cover plate.

9. A shifting arrangement according to claim 8, wherein the shifting positions of the selector lever means into the second shifting lane are fixed by a spring detent acting against its bottom side which during pivot movements of the selector lever means longitudinally of the shifting lanes is pivoted along.

10. A shifting arrangement according to claim 2, wherein the selected positions of the selector lever means in the first shifting lane are detected by sensors, the shifting from the first shifting lane into the second shifting lane by a further sensor and the signals of the sensors being applied to the electronic control apparatus by means of which the transmission is electrohydraulically actuated and wherein an indicating means is provided to display the selected positions and is activated by the sensors.

11. A shifting arrangement according to claim 2, wherein the number of pivot movements of the selector lever means in the second shifting lane are detected by sensors and applied to the control means to cause the control means to correspond to the number of the successive pivot movements of the selector lever means to shift the transmission up, respectively, down, by one, two or three speeds.

12. A shifting arrangement according to claim 1, wherein the first shifting lane extends in a driving direction of the vehicle, the second shifting lane and the transverse lane are provided in a cover plate which, together with a left lateral part and a right lateral part and a bottom plate form a hollow frame secured at a relatively fixed part of the motor vehicle.

13. A shifting arrangement according to claim 12, wherein the selector lever means is supported at the hollow frame in a cardan joint having two bearing bolts disposed perpendicular to one another for carrying out the selecting movements and the cross movement required for shifting-over from the first to the second shifting lanes.

14. A shifting arrangement according to claim 1, wherein the selector lever means includes a pin-like member and in the second shifting lane is held in the neutral, center position by two springily supported retaining pins abutting at the selector lever pin-like member on both sides thereof.

15. A shifting arrangement according to claim 12, wherein microswitches serve as position sensors for the shifting-over operation as well as for the shifting-up and shifting-down pivot movements which are accommodated in a switch housing threadably secured at the top of the cover plate.

16. A shifting arrangement according to claim 1, wherein the shifting positions of the selector lever means into the second shifting lane are fixed by a spring detent acting against its bottom side which during pivot movements of the selector lever means longitudinally of the shifting lanes is pivoted along.

17. A shifting arrangement according to claim 14, wherein microswitches serve as position sensors for the shifting-over operation as well as for the shifting-up and shifting-down pivot movements which are accommodated in a switch housing threadably secured at the top of the cover plate.

18. A shifting arrangement according to claim 14, wherein the shifting positions of the selector lever means into the second shifting lane are fixed by a spring detent acting against its bottom side which during pivot movements of the selector lever means longitudinally of the shifting lanes is pivoted along.

* * * * *